US012586825B2

(12) United States Patent
Hu et al.

(10) Patent No.: US 12,586,825 B2
(45) Date of Patent: Mar. 24, 2026

(54) NEGATIVE-ELECTRODE PLATE, PREPARATION METHOD THEREOF, AND SECONDARY BATTERY, BATTERY MODULE, BATTERY PACK, AND ELECTRIC APPARATUS CONTAINING SAME

(71) Applicant: CONTEMPORARY AMPEREX TECHNOLOGY (HONG KONG) LIMITED, Hong Kong (CN)

(72) Inventors: Bobing Hu, Ningde (CN); Shengyuan Huang, Ningde (CN); Chengyong Liu, Ningde (CN); Jiawei Fu, Ningde (CN); Xiaoning He, Ningde (CN); Jieliang Zou, Ningde (CN); Chengbin Zhong, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 779 days.

(21) Appl. No.: 17/816,426

(22) Filed: Jul. 31, 2022

(65) Prior Publication Data

US 2022/0384861 A1 Dec. 1, 2022

Related U.S. Application Data

(63) Continuation of application No. PCT/CN2021/087608, filed on Apr. 15, 2021.

(51) Int. Cl.
*H01M 10/42* (2006.01)
*H01M 4/134* (2010.01)
(Continued)

(52) U.S. Cl.
CPC ....... *H01M 10/4235* (2013.01); *H01M 4/134* (2013.01); *H01M 4/1395* (2013.01);
(Continued)

(58) Field of Classification Search
CPC ............ H01M 10/4235; H01M 4/134; H01M 4/1395; H01M 4/382; H01M 4/628;
(Continued)

(56) References Cited

U.S. PATENT DOCUMENTS 10,454,105 B2 10/2019 Tenzer et al.
2004/0072066 A1 4/2004 Cho et al.
(Continued)

FOREIGN PATENT DOCUMENTS

CN 1489229 A 4/2004
CN 105375016 A 3/2016
(Continued)

OTHER PUBLICATIONS

CN-110277593-A (machine translation) (Year: 2019).*
(Continued)

*Primary Examiner* — James M Erwin
*Assistant Examiner* — Sarah Arimintia Applegate
(74) *Attorney, Agent, or Firm* — K&L Gates LLP

(57) ABSTRACT

A negative-electrode plate, a preparation method thereof, and a secondary battery, a battery module, a battery pack, and an electric apparatus including such negative-electrode plate are provided. The negative-electrode plate includes an alkali metal layer and a polymer film layer provided on at least one surface of the alkali metal layer. Surface resistivity of the polymer film layer gradually increases in a thickness direction of the polymer film layer away from the alkali metal layer. When the negative-electrode plate is used in a secondary battery, lithium dendrites can be effectively inhibited.

13 Claims, 3 Drawing Sheets

(51) Int. Cl.

| | | |
|---|---|---|
| *H01M 4/1395* | (2010.01) | |
| *H01M 4/38* | (2006.01) | |
| *H01M 4/62* | (2006.01) | |
| *H01M 10/052* | (2010.01) | |
| *H01M 4/02* | (2006.01) | |

(52) U.S. Cl.
CPC ........... *H01M 4/382* (2013.01); *H01M 4/628* (2013.01); *H01M 10/052* (2013.01); *H01M 2004/021* (2013.01); *H01M 2004/027* (2013.01)

(58) Field of Classification Search
CPC ......... H01M 10/052; H01M 2004/021; H01M 2004/027; H01M 4/366
See application file for complete search history.

(56) References Cited

U.S. PATENT DOCUMENTS

| | | | |
|---|---|---|---|
| 2006/0134518 A1* | 6/2006 | Kogetsu | H01M 4/1391 427/58 |
| 2016/0056456 A1 | 2/2016 | Tenzer et al. | |
| 2017/0301949 A1* | 10/2017 | Mimura | H01M 4/602 |
| 2020/0274155 A1* | 8/2020 | Li | H01M 4/134 |
| 2021/0020927 A1 | 1/2021 | Youn et al. | |
| 2021/0313567 A1 | 10/2021 | Sheng et al. | |
| 2022/0238867 A1 | 7/2022 | Li | |

FOREIGN PATENT DOCUMENTS

| | | | | |
|---|---|---|---|---|
| CN | 110277593 A | * | 9/2019 | H01M 10/38 |
| CN | 111868974 A | | 10/2020 | |
| CN | 112018329 A | | 12/2020 | |
| CN | 112563461 A | | 3/2021 | |
| DE | 102016224252 A1 | | 6/2018 | |
| IN | 202017054339 A | | 12/2020 | |
| KR | 1020140112597 A | | 9/2014 | |
| WO | 2021047330 A1 | | 3/2021 | |

OTHER PUBLICATIONS

International Search Report and Written Opinion received in PCT Application PCT/CN2021/087608 on Jan. 19, 2022.

Li Jing et al:"A conductive-dielectric gradient framework for stablelithium metal anode", Energy Storage Materials, vol. 24,Jan. 1, 2020 (Jan. 1, 2020), pp. 700-706.

Hong Sang-Ho et al: "Electrical Conductivity Gradient Based on Heterofibrous Scaffolds for Stable Lithium-Metal Batteries", Advanced Functional Materials, vol. 30, No. 14,Apr. 1, 2020 (Apr. 1, 2020), p. 1908868, 10 pages.

The extended European search report received in the corresponding European Application 21912318.9, mailed Mar. 28, 2023.

The first office action received in the counterpart CN application 202180076057.8, dated May 7, 2025, 16 pages with English translation.

The second office action received in the counterpart CN application 202180076057.8, dated Aug. 19, 2025, 17 pages with English translation.

Bowler, Nicola. Eddy-Current Nondestructive Evaluation. Springer Measurement Science and Technology Series, Harbin Engineering University Press, 2017. Translated by Zhang Dongli and Wu Meixian. Cited p. 17.

Xiao Junfang. Fundamentals of Pure Electric Sedans. Hubei Science and Technology Press, 2017. Cited p. 104.

* cited by examiner

Low     Temperature     (Continuous)     High

Low     Conductivity     (Continuous)     High

Low     Temperature     (Discontinuous)     High

Low     Conductivity     (Discontinuous     High

NEGATIVE-ELECTRODE PLATE, PREPARATION METHOD THEREOF, AND SECONDARY BATTERY, BATTERY MODULE, BATTERY PACK, AND ELECTRIC APPARATUS CONTAINING SAME

CROSS-REFERENCE TO RELATED APPLICATIONS

The present disclosure is a continuation of International Application No. PCT/CN2021/087608, filed Apr. 15, 2021, and entitled "NEGATIVE-ELECTRODE PLATE, PREPARATION METHOD THEREOF, AND SECONDARY BATTERY, BATTERY MODULE, BATTERY PACK, AND ELECTRIC APPARATUS CONTAINING SAME", which is incorporated herein by reference in its entirety.

TECHNICAL FIELD

The present disclosure relates to the field of battery technologies, and in particular, to a negative-electrode plate, a preparation method thereof, and a secondary battery, a battery module, a battery pack, and an electric apparatus containing same.

BACKGROUND

Compared with a graphite material, an alkali metal material has a higher theoretical capacity and has become the "holy grail" of next-generation negative-electrode materials for high-energy-density secondary batteries. For example, lithium metal (Li) has advantages such as extremely high theoretical capacity (3860 mAh·g$^{-1}$), minimum reduction potential (−3.04 V vs. standard hydrogen electrode), minimum atomic radius, and low density (0.534 g·cm$^{-3}$). However, during deposition of alkali metals (such as lithium metal), dendrites grow inevitably, causing huge safety risks in use of alkali metal batteries.

Therefore, it is necessary to provide a technical solution to improve safety and cycle life of the alkali metal batteries.

SUMMARY

Considering the problems described in the Background, The present disclosure aims to provide a negative-electrode plate, a preparation method of the negative-electrode plate, and a secondary battery, a battery module, a battery pack, and an electric apparatus containing such negative-electrode plate. Using such negative-electrode plate in the secondary battery, battery module, battery pack, and electric apparatus can effectively inhibit lithium dendrites.

Study shows that using a porous conductive negative electrode to replace a conventional negative electrode can change ion flows on a surface of the negative electrode, slow down diffusion of lithium ions inside the porous negative electrode, allow lithium deposition at more sites, and optimize preparation processes of lithium metal batteries. However, due to the high conductivity of the porous conductive negative electrode, lithium ions will inevitably gain electrons on a surface of the negative electrode, thereby forming lithium dendrites. Based on lithium metal batteries, a porous negative-electrode structure with a variable conductivity is designed to induce lithium metal from a side with high conductivity to deposit on a side with low conductivity, thereby preventing the risk of lithium ions deposition on the surface of the porous negative electrode, and prolonging the cycle life of a lithium metal battery. However, as currently reported, discontinuous conductivity change distribution exists only between multiple negative electrodes, not inside each negative electrode. In other words, inside each negative electrode, lithium ions present no tendency of transferring from outside to inside. Especially, in the case of high current density, lithium ions tend to accumulate on a surface of a negative electrode or between negative electrodes, making it difficult to make use of an inner cavity of the porous negative electrode.

To achieve the foregoing objective, a first aspect provides a negative-electrode plate. The negative-electrode plate includes an alkali metal layer and a polymer film layer provided on at least one surface of the alkali metal layer, where surface resistivity of the polymer film layer gradually increases in a thickness direction of the polymer film layer away from the alkali metal layer.

A second aspect provides a preparation method of negative-electrode plate, including the following step:

providing a polymer film layer on a surface of an alkali metal layer, where surface resistivity of the polymer film layer gradually increases in a thickness direction of the polymer film layer away from the alkali metal layer.

A third aspect provides a secondary battery, including a negative-electrode plate. The negative-electrode plate includes the negative-electrode plate described in the first aspect or the negative-electrode plate prepared by using the method in the second aspect.

A fourth aspect provides a battery module. The battery module includes the secondary battery in the third aspect.

A fifth aspect provides a battery pack. The battery pack includes the battery module in the fourth aspect.

A sixth aspect provides an electric apparatus. The electric apparatus includes at least one of the secondary battery in the third aspect, the battery module in the fourth aspect, or the battery pack in the fifth aspect.

The present disclosure has the following beneficial effects.

The present disclosure provides a negative-electrode plate, including a high-capacity alkali metal layer and a polymer film layer provided on a surface of the alkali metal layer. Because surface resistivity of the polymer film layer continuously increases in a thickness direction away from the alkali metal layer, alkali metal ions are prevented from accumulating on a surface of the polymer film layer or between the polymer film layers when a current density is high. This helps the alkali metal ions continuously deposit from outside to inside, and evenly and densely fill in the whole polymer film layer, thereby effectively reducing lithium dendrites in the cycling process of alkali metal batteries.

DETAILED DESCRIPTION OF EMBODIMENTS

Figure 1:
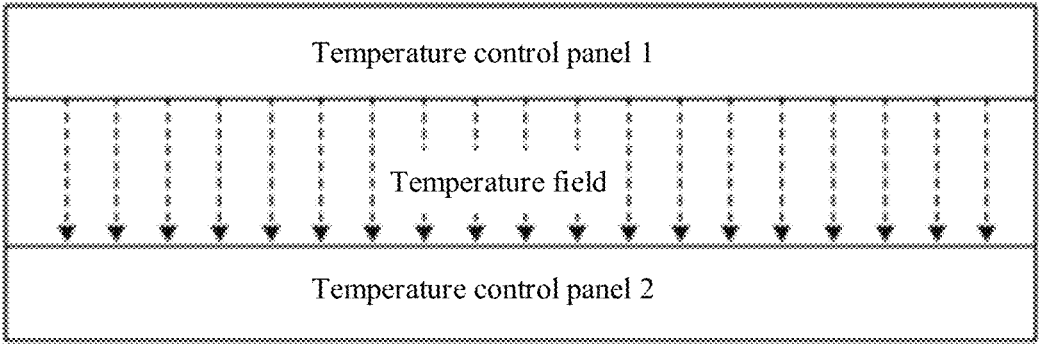
FIG. 1 is a schematic diagram of a tube furnace with dual temperature control systems according to Example 1 of The present disclosure.

Reference signs are as follows:

1—temperature control panel 1;

2—temperature control panel 2; and

3—temperature field.

The following further describes The present disclosure with reference to embodiments. It should be understood that these embodiments are merely intended to illustrate The present disclosure but not to limit the scope of The present disclosure.

For brevity, the present disclosure only provide some example numerical ranges. However, any lower limit may be combined with any upper limit to form a range not expressly recorded; any lower limit may be combined with any other lower limit to form a range not expressly recorded; and any upper limit may be combined with any other upper limit to form a range not expressly recorded. In addition, each individually disclosed point or single numerical value, as a lower limit or an upper limit, may be combined with any other point or single numerical value or combined with another lower limit or upper limit to form an unspecified range.

In the descriptions of this specification, it should be noted that "more than" or "less than" is inclusive of the present number and that "more" in "one or more" means two or more than two, unless otherwise specified.

Unless otherwise specified, terms used in The present disclosure have commonly known meanings generally understood by persons skilled in the art. Unless otherwise specified, numerical values of parameters mentioned in the present disclosure may be measured by using various measurement methods commonly used in the art (for example, testing may be performed by using a method provided in the examples of The present disclosure).

The following describes in detail a negative-electrode plate according to a first aspect; a method according to a second aspect for preparing the negative-electrode plate described in the first aspect; a secondary battery according to a third aspect using the negative-electrode plate described in the first aspect or a negative-electrode plate prepared by using the method described in the second aspect; a battery module according to a fourth aspect using the secondary battery described in the third aspect; a battery pack according to a fifth aspect using the battery module described in the fourth aspect; and an electric apparatus according to a sixth aspect using the secondary battery described in the third aspect, the battery module described in the fourth aspect, or the battery pack described in the fifth aspect in detail.

Negative-Electrode Plate

A first aspect provides a negative-electrode plate. The negative-electrode plate includes an alkali metal layer and a polymer film layer provided on at least one surface of the alkali metal layer. Surface resistivity of the polymer film layer gradually increases in a thickness direction of the polymer film layer away from the alkali metal layer.

According to some embodiments in accordance with the present disclosure, the polymer film layer includes a first surface and a second surface that are back away from each other in the thickness direction. The first surface is an outer surface of the polymer film layer facing away from the alkali metal layer. The second surface is an inner surface of the polymer film layer facing towards the alkali metal layer. Resistivity of the first surface is denoted as R1, resistivity of the second surface is denoted as R2, and the polymer film layer satisfies that resistivity increases continuously from R2 to R1. That means, resistivity $R_x$ of any surface x close to the first surface and resistivity $R_y$ of any surface y (the surface x and the surface y do not overlap) close to the second surface y satisfy $R_x > R_y$.

In the present disclosure, the resistivity of the first surface and the resistivity of the second surface of the polymer film layer can be measured in a measurement method well-known in the art. For example, the following method can be used: An ST2253 digital four-probe tester manufactured by Suzhou Jingge Electronic Co., LTD is used. Place the first surface or the second surface of the polymer film layer under the digital four-probe tester, and read a resistivity value after the value is stable.

According to some embodiments in accordance with the present disclosure, R1/R2>10. The present disclosure has discovered that, in the case of continuous conductivity change, a larger value of R1/R2 means a greater conductivity difference, which better helps lithium ions continuously deposit from outside to inside and evenly and densely fill in the whole polymer film layer, thereby inhibiting lithium dendrites more effectively. However, an excessively large conductivity difference will remarkably increase charge transfer resistance of an interface, decreasing electrochemical performance of a battery. Optionally, R1/R2 is 20-200000; and further optionally, R1/R2 is 50-150000.

According to some example implementations of the negative-electrode plate in The present disclosure, the value of R1/R2 is 20-17500, 50-52000, 500-56000, 5000-60000, 17500-72000, or 56000-114000.

According to some example implementations of the negative-electrode plate in accordance with the present disclosure, R1 is $10^2$ Ω·cm-$10^9$ Ω·cm.

According to some implementations of the negative-electrode plate in accordance with the present disclosure, R1 is $10^3$ Ω·cm-$10^6$ Ω·cm.

According to some example implementations of the negative-electrode plate in accordance with the present disclosure, R1 is 5000 Ω·cm-10000 Ω·cm, 15000 Ω·cm-20000 Ω·cm, 25000 Ω·cm-30000 Ω·cm, 35000 Ω·cm-40000 Ω·cm, 45000 Ω·cm-50000 Ω·cm, or 55000 Ω·cm-60000 Ω·cm.

According to some example implementations of the negative-electrode plate in accordance with the present disclosure, R2 is 1 Ω·cm-$10^4$ Ω·cm.

According to some example implementations of the negative-electrode plate in accordance with the present disclosure, R2 is 5 Ω·cm-1000 Ω·cm.

According to some example implementations of the negative-electrode plate in accordance with the present disclosure, R2 is 10 Ω·cm-50 Ω·cm, 75 Ω·cm-200 Ω·cm, 250 Ω·cm-400 Ω·cm, 450 Ω·cm-600 Ω·cm, 650 Ω·cm-700 Ω·cm, or 750 Ω·cm-1000 Ω·cm.

According to some example implementations of the negative-electrode plate in accordance with the present disclosure, thickness of the polymer film layer is 1 μm-1200 μm, optionally 5 μm-1000 μm, and further optionally 50 μm-200 μm, for example, 1 μm, 5 μm, 10 μm, 20 μm, 30 μm, 40 μm, 50 μm, 60 μm, 70 μm, 80 μm, 90 μm, 100 μm, 150 μm, 200 μm, 250 μm, 300 μm, 350 μm, 400 μm, 450 μm, 500 μm, 550 μm, 600 μm, 650 μm, 700 μm, 750 μm, 800 μm, 850 μm, 900

μm, 950 μm, 1000 μm, 1050 μm, 1100 μm, 1150 μm, 1200 μm, and any value between these values. With a thickness within such range, the polymer film layer stays sufficiently strong and structurally stable and has smaller adverse effect on energy density of the battery.

According to some example implementations of the negative-electrode plate in The present disclosure, thickness of the alkali metal layer is 1 μm-1000 μm, optionally 5 μm-500 μm, and further optionally 10 μm-50 μm, for example, 1 μm, 5 μm, 10 μm, 20 μm, 30 μm, 40 μm, 50 μm, 60 μm, 70 μm, 80 μm, 90 μm, 100 μm, 150 μm, 200 μm, 250 μm, 300 μm, 350 μm, 400 μm, 450 μm, 500 μm, 550 μm, 600 μm, 650 μm, 700 μm, 750 μm, 800 μm, 850 μm, 900 μm, 950 μm, 1000 μm, and any value between these values. With a thickness within such range, the alkali metal layer can provide an appropriate amount of active ions for charge-discharge cycling of an alkali metal battery.

According to some example implementations of the negative-electrode plate in accordance with the present disclosure, the polymer film layer is of a porous structure. The porous structure allows lithium to deposit into pores to suppress battery swelling. Moreover, a large specific surface area of the porous structure can reduce current density on a surface, promote even deposition of lithium metal, and inhibit lithium dendrite formation. In this invention, the porous structure has a porosity of not less than 50%.

According to some implementations of the negative-electrode plate in accordance with the present disclosure, the alkali metal is at least one of lithium, potassium, and sodium. In some embodiments, the alkali metal layer is a lithium metal layer.

Figure 5:
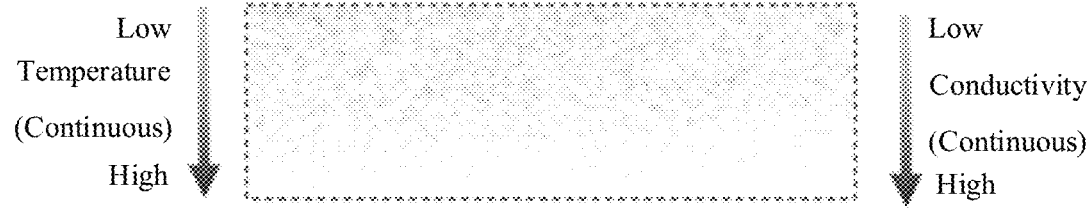
FIG. 5 is an oxygen distribution diagram in a cross-sectional direction according to Example 1 of The present disclosure.
Figure 6:
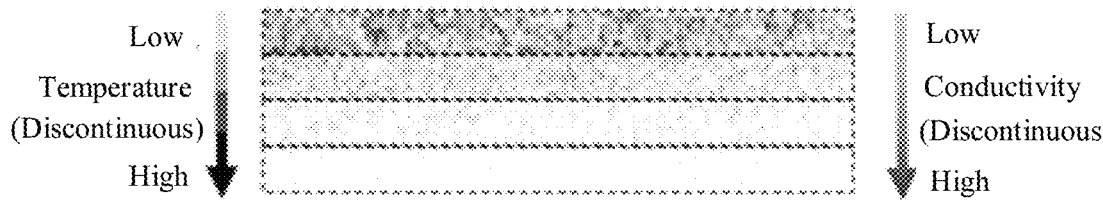
FIG. 6 is an oxygen distribution diagram in a cross-sectional direction of Comparative Example 1.

According to some implementations of the negative-electrode plate in accordance with the present disclosure, a method for examining a polymer film layer of The present disclosure may be: As sintering temperature increases, carbonized degree of a polymer film layer is higher, content of impurity elements such as O and N is decreasing, and conductivity is getting better. Therefore, whether the polymer film layer has continuous conductivity change can be determined by measuring distribution of element O or N in a cross-sectional direction. FIG. 5 shows oxygen distribution in a cross-sectional direction in Example 1 (continuous conductivity change). FIG. 6 shows oxygen distribution in a cross-sectional direction in Comparative Example 1 (discontinuous conductivity change). Oxygen content in a specific area (2 μm*2 μm) may be measured through energy dispersive spectroscopy (EDS). In Example 1 (FIG. 5), any randomly selected areas on a surface have different oxygen content, presenting a continuous conductivity change. In comparative Example 1 (FIG. 6), some adjacent areas on a surface have equivalent oxygen content, presenting a discontinuous conductivity change.

Preparation Method of Negative-Electrode Plate

In a second aspect, The present disclosure provides a preparation method of negative-electrode plate. The method includes the following steps:

providing a polymer film layer on a surface of an alkali metal layer, where surface resistivity of the polymer film layer gradually increases in a thickness direction of the polymer film layer away from the alkali metal layer.

According to some implementations of the preparation method in The present disclosure, the alkali metal layer is at least one of a lithium metal layer, a potassium metal layer, and a sodium metal layer.

According to some implementations of the preparation method in The present disclosure, thickness of the alkali metal layer is 1 μm-1000 μm, optionally 5 μm-500 μm, and further optionally 10 μm-50 μm, for example, 1 μm, 5 μm, 10 μm, 20 μm, 30 μm, 40 μm, 50 μm, 60 μm, 70 μm, 80 μm, 90 μm, 100 μm, 150 μm, 200 μm, 250 μm, 300 μm, 350 μm, 400 μm, 450 μm, 500 μm, 550 μm, 600 μm, 650 μm, 700 μm, 750 μm, 800 μm, 850 μm, 900 μm, 950 μm, 1000 μm, and any value between these values. With a thickness within such range, the alkali metal layer can provide an appropriate amount of active ions for charge-discharge cycling of an alkali metal battery.

According to some implementations of the preparation method in The present disclosure, the preparation method of the polymer film layer includes the following steps:

S1: providing a polymer film, where the polymer film includes a first surface and a second surface that are back away from each other in a thickness direction; and S2: sintering the polymer film in S1 to obtain a polymer film layer, where sintering temperature T1 of the first surface is less than sintering temperature T2 of the second surface;

where the polymer film layer includes a first surface and a second surface that are back away from each other in the thickness direction, resistivity of the first surface is denoted as R1, resistivity of the second surface is denoted as R2, and the polymer film layer satisfies that resistivity increases continuously from R2 to R1.

According to some implementations of the preparation method in The present disclosure, the polymer film includes one or more of nitrile polymer, alcohol polymer, cellulose polymer, sulfone polymer, amine polymer, ester polymer, and ketone polymer; and preferably, the polymer film includes one or more of polyacrylonitrile, polyvinyl alcohol, carboxymethyl cellulose, and polysulfuriamide. A polymer film selected therefrom can increase affinity with lithium metal, decrease overpotential of lithium deposition reaction, and facilitate homogeneous nucleation of lithium ions, thereby improving cycling stability of a lithium metal battery.

According to some implementations of the preparation method in The present disclosure, T1 is 200° C.-2000° C., and optionally 200° C.-400° C.

According to some implementations of the preparation method in The present disclosure, T2 is 200° C.-2000° C., and optionally 600° C.-2000° C.

According to some implementations of the preparation method in The present disclosure, T2-T1>200° C., optionally 400° C.≤T2-T1≤1500° C., and further optionally 600° C.≤T2-T1≤1500° C., for example, T2-T1 may be 400° C., 450° C., 500° C., 550° C., 600° C., 650° C., 700° C., 750° C., 800° C., 850° C., 900° C., 950° C., 1000° C., 1050° C., 1100° C., 1150° C., 1200° C., 1250° C., 1300° C., 1350° C., 1400° C., 1450° C., 1500° C., and any value between these values. When T2-T1 is within the foregoing range, the resistivity of the first surface and the resistivity of the second surface can be maintained in an appropriate gradient range to induce lithium ions to continuously move and deposit into the polymer film layer, thereby inhibiting local accumulation of lithium on the polymer film layer and lithium dendrite formation. Moreover, a resistivity in an appropriate range can reduce charge transfer resistance on an interface, thereby improving electrochemical performance of the battery.

According to some implementations of the preparation method in accordance with the present disclosure, the sintering time is 0.5 h-5 h, and preferably 1 h-3 h. When the sintering time is in the foregoing range, the resistivity change range of the polymer film layer can be effectively controlled, which helps form an appropriate resistivity gradient inside the polymer film layer and promotes uniform deposition of lithium metal inside the polymer film layer. Moreover, limiting the sintering time can improve preparation efficiency of the polymer film layer and reduce process costs.

According to implementations of the preparation method in accordance with the present disclosure, in S1, the polymer film may be an electrostatic spinning polymer film. A method for forming a polymer film by electrostatic spinning in The present disclosure may be an electrostatic spinning technology commonly used in the art. For example, in a special form of polymer fluid electrostatic atomization, atomized substances are not tiny droplets but tiny jets of polymer, which can travel a considerable distance and finally solidify into fibers.

According to some implementations of the preparation method in The present disclosure, thickness of the polymer film is 1 μm-1200 μm, optionally 5 μm-1000 μm, and further optionally 50 μm-200 μm, for example, 5 μm, 10 μm, 20 μm, 30 μm, 40 μm, 50 μm, 60 μm, 70 μm, 80 μm, 90 μm, 100 μm, 150 μm, 200 μm, 250 μm, 300 μm, 350 μm, 400 μm, 450 μm, 500 μm, 550 μm, 600 μm, 650 μm, 700 μm, 750 μm, 800 μm, 850 μm, 900 μm, 950 μm, 1000 μm, and any value between these values. When the thickness of the polymer film is within the foregoing range, mechanical strength of the polymer film can be improved to maintain a stable self-supporting film structure, thereby reducing the process difficulty. In addition, the polymer film will affect thickness of the polymer film layer subsequently obtained through sintering. An appropriate thickness of the polymer film not only helps improve the strength of the polymer film layer, but also helps form a sufficiently wide resistivity gradient.

Secondary Battery

In a third aspect, The present disclosure provides a secondary battery. The secondary battery includes a positive-electrode plate, a negative-electrode plate, a separator, and an electrolyte. In a battery charging/discharging process, active ions are intercalated and deintercalated between the positive-electrode plate and the negative-electrode plate. The electrolyte conducts ions between the positive-electrode plate and the negative-electrode plate.

[Positive-Electrode Plate]

In the secondary battery in The present disclosure, the positive-electrode plate includes a positive-electrode polymer film layer and a positive-electrode film layer that is provided on at least one surface of the positive-electrode polymer film layer and that includes a positive-electrode active material.

It can be understood that the positive-electrode polymer film layer has two opposite surfaces in its thickness direction, and the positive-electrode film layer can be provided on either or both of the two opposite surfaces of the positive-electrode polymer film layer.

In the secondary battery in The present disclosure, the positive-electrode polymer film layer may be a metal foil or a composite polymer film layer. For example, an aluminum foil may be used. The composite polymer film layer may be formed by forming a metal material (copper, copper alloy, nickel, nickel alloy, titanium, titanium alloy, silver, silver alloy, or the like) on a polymer matrix.

In the secondary battery of The present disclosure, the positive-electrode active material may be a commonly known positive-electrode active material used for secondary batteries in the art. For example, the positive-electrode active material may include one or more of lithium-containing transition metal oxide, lithium-containing phosphate with olivine-type structure, and respective modified compounds thereof. Examples of the lithium transition metal oxide may include but are not limited to one or more of lithium cobalt oxide, lithium nickel oxide, lithium manganese oxide, lithium nickel cobalt oxide, lithium manganese cobalt oxide, lithium manganese nickel oxide, lithium nickel cobalt manganese oxide, lithium nickel cobalt aluminum oxide, and modified compounds thereof. Examples of the lithium-containing phosphate with olivine-type structure may include but are not limited to one or more of lithium iron phosphate, composite materials of lithium iron phosphate and carbon, lithium manganese phosphate, composite materials of lithium manganese phosphate and carbon, lithium manganese iron phosphate, composite materials of lithium manganese iron phosphate and carbon, and modified compounds thereof. The present disclosure is not limited to these materials, and other conventionally well-known materials that can be used as a positive-electrode active material for secondary batteries may also be used.

In some preferred embodiments, to further improve energy density of batteries, the positive-electrode active material may include one or more of lithium transition metal oxides shown in formula 1 and modified compounds thereof:

$$Li_aNi_bCo_cM_dO_eA_f \qquad \text{formula 1}$$

In formula 1, $0.8 \leq a \leq 1.2$, $0.5 \leq b < 1$, $0 < c < 1$, $0 < d < 1$, $1 \leq e \leq 2$, $0 \leq f \leq 1$, M is selected from one or more of Mn, Al, Zr, Zn, Cu, Cr, Mg, Fe, V, Ti, and B, and A is selected from one or more of N, F, S, and Cl.

In The present disclosure, the modified compounds of the foregoing materials may be obtained through doping modification and/or surface coating modification to the materials.

[Electrolyte]

The electrolyte conducts ions between the positive-electrode plate and the negative-electrode plate. The electrolyte is not limited to any specific type in The present disclosure, and may be selected as required. For example, the electrolyte may be selected from at least one of a solid electrolyte and a liquid electrolyte (that is, an electrolyte solution).

In some examples, the electrolyte is an electrolyte solution. The electrolyte solution includes an electrolytic salt and a solvent.

In some embodiments, the electrolytic salt may be selected from one or more of lithium hexafluorophosphate (LiPF$_6$), lithium tetrafluoroborate (LiBF$_4$), lithium perchlorate (LiClO$_4$), lithium hexafluoroarsenate (LiAsF$_6$), lithium bis(fluorosulfonyl)imide (LiFSI), lithium bistrifluoromethanesulfonimide (LiTFSI), lithium trifluoromethanesulfonate (LiTFS), lithium difluoro(oxalato)borate (LiDFOB), lithium dioxalate borate (LiBOB), lithium difluorophosphate (LiPO$_2$F$_2$), lithium difluoro(dioxalato)phosphate (LiDFOP), and lithium tetrafluoro oxalato phosphate (LiTFOP).

In some embodiments, the solvent may be selected from one or more of ethylene carbonate (EC), propylene carbonate (PC), ethyl methyl carbonate (EMC), diethyl carbonate (DEC), dimethyl carbonate (DMC), dipropyl carbonate (DPC), methyl propyl carbonate (MPC), ethyl propyl carbonate (EPC), butylene carbonate (BC), fluoroethylene carbonate (FEC), methylmethyl formate (MF), methyl acetate (MA), ethyl acetate (EA), propyl acetate (PA), methyl propionate (MP), ethyl propionate (EP), propyl propionate (PP), methyl butyrate (MB), ethyl butyrate (EB), 1,4-butyrolactone (GBL), tetramethylene sulfone (SF), methyl sulfone (MSM), ethyl methyl sulfone (EMS), and diethyl sulfone (ESE).

In some examples, the electrolyte solution may further optionally include an additive. For example, the additive may include a negative-electrode film forming additive, or may include a positive-electrode film forming additive, or may include an additive capable of improving some performance of batteries, for example, an additive for improving over-charge performance of batteries, an additive for improving high-temperature performance of batteries, or an additive for improving low-temperature performance of batteries.

[Separator]

Secondary batteries using an electrolyte solution and some secondary batteries using a solid electrolyte further include a separator. The separator is disposed between the positive-electrode plate and the negative-electrode plate to provide separation. The separator is not limited to any specific type in The present disclosure, and may be any commonly known porous separator with good chemical stability and mechanical stability.

In some embodiments, a material of the separator may be selected from one or more of glass fiber, non-woven fabric, polyethylene, polypropylene, and polyvinylidene fluoride. The separator may be a single-layer thin film or a multilayer composite thin film. When the separator is a multilayer composite thin film, each layer may be made of the same or different materials.

In some embodiments, the positive-electrode plate, the negative-electrode plate, and the separator may be made into an electrode assembly through winding or lamination.

In some embodiments, the secondary battery may include an outer package. The outer package is used for packaging the electrode assembly and the electrolyte.

In some embodiments, the outer package of the secondary battery may be a hard shell, for example, a hard plastic shell, an aluminum shell, or a steel shell. The outer package of the secondary battery may alternatively be a soft pack, for example, a soft pouch. A material of the soft pack may be plastic, for example, one or more of polypropylene (PP), polybutylene terephthalate (PBT), polybutylene succinate (PBS), and the like.

The secondary battery is not limited to a particular shape in The present disclosure, and may be cylindrical, rectangular, or of any other shapes.

In some embodiments, the outer package may include a housing and a cover plate. The housing may include a base plate and a side plate connected onto the base plate, and the base plate and the side plate enclose an accommodating cavity. The housing has an opening communicating with the accommodating cavity, and the cover plate can cover the opening to close the accommodating cavity. A positive-electrode plate, a negative-electrode plate, and a separator may be made into an electrode assembly through winding or lamination. The electrode assembly is packaged in the accommodating cavity. The electrolyte solution infiltrates the electrode assembly. There may be one or more electrode assemblies in the secondary battery, and the quantity may be adjusted as required.

Preparation Method of Secondary Battery

The present disclosure also provides a preparation method of secondary battery, including preparing a negative-electrode plate for the secondary battery according to the following steps:

assembling the negative-electrode plate described in the first aspect or the negative-electrode plate prepared according to the method described in the second aspect, with a high-conductivity side of a polymer film layer close to the alkali metal layer, and a low-conductivity side of the polymer film layer back away from the alkali metal layer and facing towards a positive-electrode/separator; and testing an alkali metal battery.

Except for the preparation method of negative-electrode plate in The present disclosure, other methods for constructing and preparing the secondary battery in The present disclosure are commonly known. For example, the positive-electrode plate in The present disclosure can be prepared by using the following method: mixing and dispersing a positive-electrode active material, an optional conductive agent (for example, a carbon material such as carbon black), a binder (for example, PVDF), and the like in a solvent (for example, NMP), stirring the resulting mixture well, and then applying the mixture on a positive-electrode polymer film layer, followed by drying, to obtain a positive-electrode plate. A metal foil such as an aluminum foil or a material such as a porous metal plate may be used as the positive-electrode polymer film layer. A positive-electrode plate can be prepared by punching or laser die-cutting in an uncoated region of the positive-electrode polymer film layer.

Finally, the positive-electrode plate, the separator, and the negative-electrode plate are sequentially stacked so that the separator is located between the positive-electrode plate and the negative-electrode plate to provide separation. Then, the resulting stack is wound (or laminated) to form an electrode assembly. The electrode assembly is placed into the outer package which is filled with electrolyte after drying, followed by processes including vacuum packaging, standing, formation, and shaping, to obtain the secondary battery.

Battery Module

A fourth aspect provides a battery module. The battery module includes the secondary battery in the third aspect. The battery module in The present disclosure uses the secondary battery provided in The present disclosure, and therefore has at least the same advantages as the secondary battery.

The battery module in The present disclosure may include a plurality of secondary batteries. A specific quantity may be adjusted based on application and capacity of the battery module.

Optionally, the battery module may further include a housing with an accommodating space, and the plurality of secondary batteries are accommodated in the accommodating space.

Battery Pack

A fifth aspect provides a battery pack. The battery pack includes the battery pack in the fourth aspect. A quantity of battery modules included in the battery pack may be adjusted based on application and capacity of the battery pack.

Electric Apparatus

A sixth aspect provides an electric apparatus. The electric apparatus includes at least one of the secondary battery in the third aspect, the battery module in the fourth aspect, or the battery pack in the fifth aspect. The secondary battery may be used as a power source of the electric apparatus or an energy storage unit of the electric apparatus. The electric apparatus in The present disclosure uses the secondary battery provided in The present disclosure, and therefore has at least the same advantages as the secondary battery.

The electric apparatus may be, but is not limited to, a mobile device (for example, a mobile phone or a notebook computer), an electric vehicle (for example, a battery electric vehicle, a hybrid electric vehicle, a plug-in hybrid electric vehicle, an electric bicycle, an electric scooter, an electric golf vehicle, or an electric truck), an electric train, a ship, a satellite system, an energy storage system, and the like.

The secondary battery, the battery module, or the battery pack may be selected for the electric apparatus based on requirements for using the electric apparatus.

In another example, the electric apparatus may be a mobile phone, a tablet computer, a notebook computer, or the like. The electric apparatus is usually required to be light and thin, and the secondary battery may be used as a power source.

To explain technical contents, construction features, and objectives and effects achieved of technical solutions in detail, the following describes in detail with reference to specific examples. It should be understood that these examples are merely used to describe The present disclosure but not to limit the scope of The present disclosure.

EXAMPLES

To make the invention objectives, technical solutions, and beneficial technical effects of The present disclosure clearer, The present disclosure is further described below in detail with reference to examples. However, it should be understood that the examples of The present disclosure are merely intended to explain The present disclosure, but not to limit The present disclosure, and the examples of The present disclosure are not limited to the examples given in this specification. In examples in which specific test conditions or operating conditions are not specified, preparation is performed according to conventional conditions or according to conditions recommended by a material supplier.

Polymers used in examples and comparative examples are as follows:

polyacrylonitrile: with a molecular mass of 1,000,000, and purchased from Sigma Aldrich (Sigma Aldrich);

polyvinylpyrrolidone: with a molecular mass of 130,000, and purchased from Sigma Aldrich (Sigma Aldrich);

polyvinyl alcoho: with a molecular mass of 900,000, and purchased from Sigma Aldrich (Sigma Aldrich);

carboxymethyl cellulose: with a molecular mass of 1,000, 000, and purchased from Sigma Aldrich (Sigma Aldrich); and polysulfone amide: with a molecular mass of 1,000,000, and purchased from Sigma Aldrich (Sigma Aldrich).

Test methods of resistivity and resistivity distribution are as follows.

In The present disclosure, resistivity and resistivity distribution of a polymer film layer have meanings commonly known in the art, and can be measured by using methods known in the art. For example, in this example, an ST2253 digital four-probe tester manufactured by Suzhou Jingge Electronic Co., LTD was used. Specifically, a polymer film layer was placed under the digital four-probe tester, and a resistivity value was read after the value became stable.

A method for measuring elements distribution in a polymer film layer is as follows.

In The present disclosure, elements distribution in a polymer film layer has a meaning commonly known in the art, and can be measured by using a method known in the art. In this example, a Zeiss Gemini 500 scanning electron microscope was used to perform EDX analysis on a cross section of the polymer film layer to obtain elements distribution of the polymer film layer.

A method for measuring thickness of a polymer film layer is as follows.

In The present disclosure, thickness of a polymer film layer has a meaning commonly known in the art, and can be measured by using a method known in the art. A Zeiss Gemini 500 scanning electron microscope was used to perform an SEM analysis on a cross section of the polymer film layer to measure the thickness of the cross section of the polymer film layer.

A method for testing a porous structure is as follows.

In The present disclosure, a porous structure of a polymer film layer has a meaning commonly known in the art, and can be tested by using a method known in the art. In The present disclosure, a scanning electron microscope (SEM, ThermoFisher Scientific) was used.

A method for testing the number of cycles is as follows.

In the following examples, the number of cycles is the number of cycles when capacity is reduced to 80%.

Example 1

(1) Preparation of Polymer Film Layer

Step 1: 5 g of polyacrylonitrile and 1 g of polyvinylpyrrolidone were dissolved in 5 mL of dimethylformamide (DMF) to prepare a polymer solution containing polyacrylonitrile and polyvinylpyrrolidone. At a voltage of 20 kV, the above-mentioned polymer solution was sprayed on an aluminum foil at a uniform speed through electrostatic spinning and solidified to form polymer nanofibers. The polymer nanofibers were peeled off from the aluminum foil to obtain a polymer fiber film (a polymer film), with a thickness controlled at 200 μm.

Figure 2:
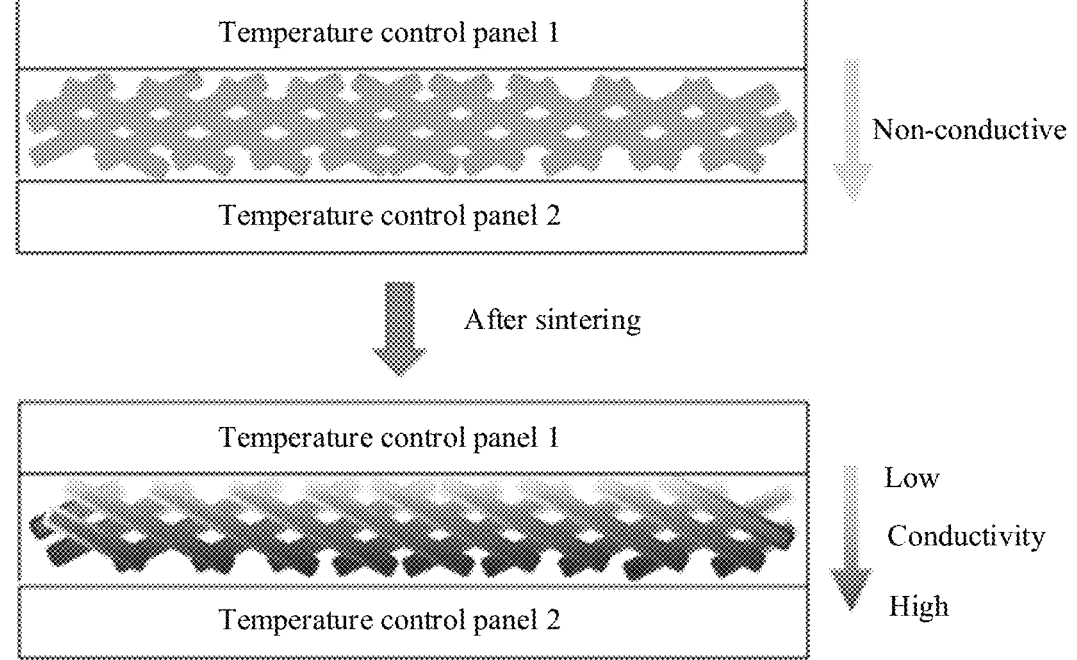
FIG. 2 is a schematic diagram of a preparation process of a polymer film layer according to Example 1 of The present disclosure.

Step 2: The polymer fiber film was placed in a tube furnace with dual temperature control systems shown in FIG. 1, where the temperature of a temperature control panel 1 was 400° C., temperature of a temperature control panel 2 was 1000° C., and a temperature field was provided between the temperature control panels 1 and 2. The polymer fiber film was sintered for 2 h to obtain a polymer film layer. The formation process is shown in FIG. 2. The polymer film layer includes a first surface and a second surface that are back away from each other in a thickness direction. Resistivity of the first surface is denoted as R1, and resistivity of the second surface is denoted as R2. Refer to Table 1 for specific values of the resistivity R1 of the first surface and the resistivity R2 of the second surface. The resistivity of the polymer film layer decreased continuously in the thickness direction from the first surface to the second surface. Before the sintering, the polymer film layer was non-conductive. After the sintering, the polymer film layer was conductive. SEM was used to observe the polymer film layer which was a porous structure.

(2) Preparation of Negative-Electrode Plate

The obtained polymer film layer with continuous conductivity change and lithium metal (thickness: 20 μm) were rolled and compounded to obtain a negative-electrode plate with a high-conductivity side close to the lithium metal.

(3) Preparation of Battery

A separator (PP) was placed on a low-conductivity side of the polymer film layer in the negative-electrode plate, and an NCM811 positive-electrode plate was placed on the other side of the separator, so as to assemble a lithium metal battery. Then an electrolyte (containing ethylene carbonate with 1 mol/L of lithium bisfluorosulfonimide) was injected. An amount of injected electrolyte was 3 g/Ah.

Examples 2-4

Different from Example 1, polyacrylonitrile used in Example 1 was respectively replaced with polyvinyl alcohol, carboxymethyl cellulose, and polysulfoneamide in Examples 2-4.

Examples 5-9

Different from Example 1, the polymer fiber film (the polymer film) with a thickness of 200 μm in Example 1 was respectively replaced with a polymer fiber film with a thickness of 5 μm, 10 μm, 50 μm, 100 μm, and 1000 μm in Examples 5-9.

Examples 10-12

Different from Example 1, temperature of the temperature control panel 2 being 1000° C. in Example 1 was respectively replaced with 600° C., 800° C., and 1500° C. in Examples 10-12.

Example 13

Different from Example 1, in Example 13, temperature of the temperature control panel 1 was 200° C., and temperature of the temperature control panel 2 was 1000° C.

Example 14

Different from Example 1, in Example 14, temperature of the temperature control panel 1 was 200° C., and temperature of the temperature control panel 2 was 2000° C.

Comparative Example 1

Figure 3:
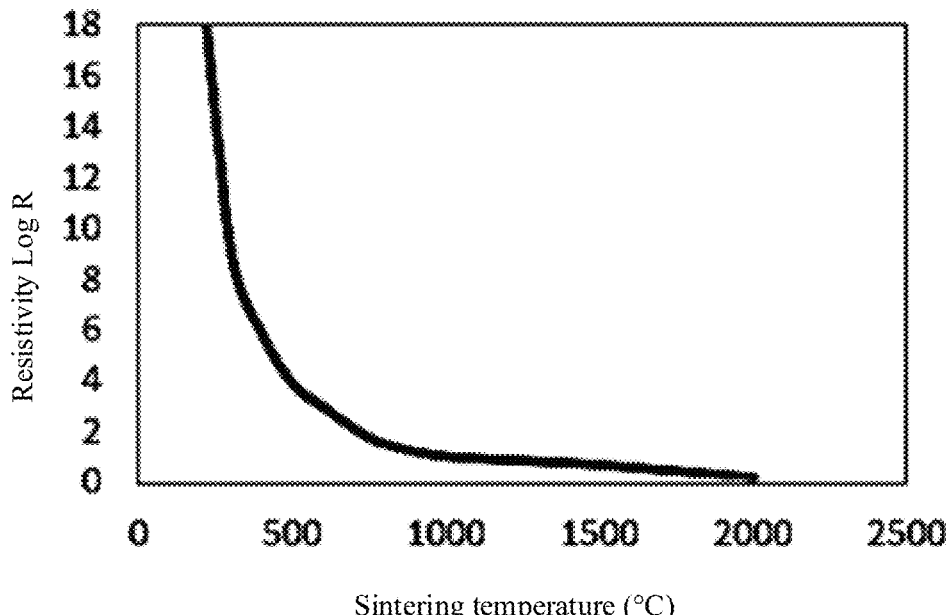
FIG. 3 is a relationship diagram of sintering temperature and resistivity Log·R of a polymer film layer according to Comparative Example 1, where the "resistivity Log·R" is a logarithmic relationship of resistivity, the unit of resistivity is Ω·cm, and the unit of sintering temperature is ° C.

5 g of polyacrylonitrile and 1 g of polyvinylpyrrolidone were dissolved in 5 mL of DMF to formulate an electrostatic spinning solution containing mainly polyacrylonitrile polymer. Then at a high voltage of 15 kV, the electrostatic spinning solution was sprayed on an aluminum foil at a uniform speed and solidified to form polymer nanofibers containing mainly polyacrylonitrile, with a thickness controlled at 50 μm. The same method was used to prepare four polymer fiber films. The four films were sintered for 2 h at 400° C., 600° C., 800° C., and 1000° C., respectively. Resistivity changes of the spinning films sintered at different temperatures are shown in FIG. 3. Then the four films were pressed together by rolling to form a lithium metal polymer film layer with discontinuous conductivity change. Then the obtained lithium metal polymer film layer with discontinuous conductivity change was disposed on a lithium metal surface, and assembled with an NCM811 to obtain a lithium metal battery. Then cycling performance of the battery was tested.

Comparative Example 2

Different from Example 1, in Comparative Example 2, temperature of temperature control panel 1 and temperature of temperature control panel 2 were both 1000° C.

Comparative Example 3

Different from Example 1, in Comparative Example 3, temperature of temperature control panel 1 and temperature of temperature control panel 2 were both 400° C.

Refer to Table 1 for composition and product parameters of polymer film layers in Examples 1-14 and Comparative Examples 1-3.

TABLE 1

| | | | | | | | | |
|---|---|---|---|---|---|---|---|---|
| Comparison of material, thickness, and sintering temperature of lithium metal polymer film layers | | | | | | | | |
| | Polymer material type | Thickness of polymer film (μm) | Temperature of temperature control panel 1 (° C.) | Temperature of temperature control panel 2 (° C.) | R1 (Ω · cm) | R2 (Ω · cm) | R1/R2 | Being a porous structure? |
| Example 1 | Polyacrylonitrile | 200 | 400 | 1000 | 560000 | 10 | 56000 | Yes |
| Example 2 | Plyvinyl alcohol | 200 | 400 | 1000 | 610000 | 11 | 56000 | Yes |
| Example 3 | Carboxymethyl cellulose | 200 | 400 | 1000 | 480000 | 9.3 | 52000 | Yes |
| Example 4 | Polysulfone amide | 200 | 400 | 1000 | 450000 | 8.1 | 56000 | Yes |
| Example 5 | Polyacrylonitrile | 5 | 400 | 1000 | 560000 | 10 | 56000 | Yes |
| Example 6 | Polyacrylonitrile | 10 | 400 | 1000 | 560000 | 10 | 56000 | Yes |
| Example 7 | Polyacrylonitrile | 50 | 400 | 1000 | 560000 | 10 | 56000 | Yes |
| Example 8 | Polyacrylonitrile | 100 | 400 | 1000 | 560000 | 10 | 56000 | Yes |
| Example 9 | Polyacrylonitrile | 1000 | 400 | 1000 | 560000 | 10 | 56000 | Yes |
| Example 10 | Polyacrylonitrile | 200 | 400 | 600 | 560000 | 860 | 651 | Yes |
| Example 11 | Polyacrylonitrile | 200 | 400 | 800 | 560000 | 32 | 17500 | Yes |
| Example 12 | Polyacrylonitrile | 200 | 400 | 1500 | 560000 | 9.3 | 60000 | Yes |
| Example 13 | Polyacrylonitrile | 200 | 200 | 1000 | 720000 | 10 | 72000 | Yes |
| Example 14 | Polyacrylonitrile | 200 | 200 | 2000 | 720000 | 6.3 | 114000 | Yes |
| Comparative Example 1 | Polyacrylonitrile | 50 + 50 + 50 + 50 | — | — | 560000 | 10 | 56000 | Yes |
| Comparative Example 2 | Polyacrylonitrile | 200 | 1000 | 1000 | 10 | 10 | 1 | Yes |
| Comparative Example 3 | Polyacrylonitrile | 200 | 400 | 400 | 560000 | 560000 | 1 | Yes |

Battery Performance Test

A pouch battery was used. NCM811 positive electrodes in Examples 1-14 and Comparative Examples 1-3 were used separately. Capacity per unit area of a positive-electrode plate is 4 mAh·cm$^{-2}$. A negative electrode was lithium foil (with an area of 40 cm$^2$). A polymer film layer was disposed on a surface of the negative electrode. Capacity of the pouch battery was 140 mAh. A test voltage range was 2.8 V-4.3 V. A charge rate and a discharge rate were both 0.2 C. A discharge capacity after an initial charge-discharge cycle is a first-cycle discharge capacity. A discharge capacity after a plurality of charge-discharge cycles is a cyclic discharge capacity. The number of cycles when the cyclic discharge capacity is reduced to 80% of the first-cycle discharge capacity is the number of cycles of the battery. For test results, refer to Table 2.

TABLE 2

Performance comparison of batteries using different types of lithium metal polymer film layers

| | Number of cycles (capacity decay to 80%) |
| --- | --- |
| Example 1 | 289 |
| Example 2 | 282 |
| Example 3 | 285 |
| Example 4 | 283 |
| Example 5 | 225 |
| Example 6 | 238 |
| Example 7 | 251 |
| Example 8 | 267 |
| Example 9 | 270 |
| Example 10 | 271 |
| Example 11 | 275 |
| Example 12 | 288 |
| Example 13 | 278 |
| Example 14 | 246 |
| Comparative Example 1 | 220 |
| Comparative Example 2 | 167 |
| Comparative Example 3 | 86 |

According to Table 2, the number of cycles of the battery prepared by using the negative-electrode plate of The present disclosure can be significantly increased.

Figure 4:
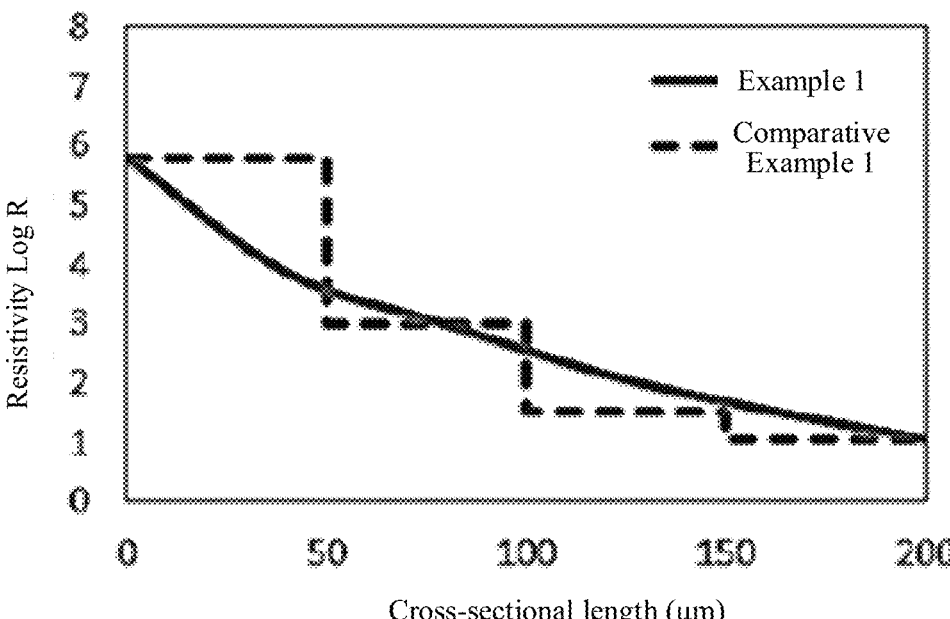
FIG. 4 is a distribution diagram of cross-sectional length and resistivity Log Ω·cmR of Example 1 and Comparative Example 1 according to The present disclosure, where the "resistivity Log·R" is a logarithmic relationship of resistivity, the unit of resistivity is Ω·cm, and the unit of cross-sectional length is μm.

The test results of resistivity distribution in a cross-sectional direction in Example 1 (with continuous conductivity change) and Comparative Example 1 (with discontinuous conductivity change) are shown in FIG. 4, where the x-coordinate represents cross-sectional length, and the y-coordinate represents resistivity. The results show that a polymer film layer prepared by using the dual-temperature control system has a resistivity that continuously changes with the cross-sectional length, while a polymer film layer prepared by laminating four films in comparative Example 1 does not have a continuously changing resistivity.

Test results of oxygen distribution in a cross-sectional direction in Example 1 (with continuous conductivity change) and Comparative Example 1 (with discontinuous conductivity change) are shown in FIG. 5 and FIG. 6. In Example 1, the oxygen distribution gradually decreases from top to bottom, presenting a continuous change. In Comparative Example 1, the oxygen distribution is obviously hierarchical, presenting a discontinuous change. This indicates that resistivity of the polymer film layer in The present disclosure increased continuously from the resistivity of the first surface to the resistivity of the second surface. In Comparative Example 1, resistivity of the polymer film layer changed discontinuously from the resistivity of the first surface to the resistivity of the second surface.

It should be further noted that according to the disclosure and guidance in this specification, a person skilled in the art to which The present disclosure relates may also make appropriate changes and modifications to the foregoing examples. Therefore, The present disclosure is not limited to the specific examples disclosed and described above, and modifications and changes to The present disclosure also fall within the protection scope of the claims of The present disclosure. In addition, although some specific terms are used in this specification, these terms are used only for ease of description, and do not constitute any limitation on The present disclosure.

What is claimed is:

1. A negative-electrode plate, comprising an alkali metal layer and a polymer film layer provided on at least one surface of the alkali metal layer, wherein the polymer film layer comprises a first surface and a second surface that are back away from each other in a thickness direction of the polymer film layer, the first surface being an outer surface of the polymer film layer facing away from the alkali metal layer, and the second surface being an inner surface of the polymer film layer facing towards the alkali metal layer, wherein resistivity of the first surface is denoted as R1, resistivity of the second surface is denoted as R2, and the polymer film layer satisfies that resistivity increases continuously from R2 to R1, R1 is $10^2$ Ω·cm-$10^9$ Ω·cm, R2 is 1 Ω·cm-$10^4$ Ω·cm.

2. The negative-electrode plate according to claim 1, wherein R1/R2>10.

3. The negative-electrode plate according to claim 1, wherein thickness of the polymer film layer is 1 μm-1200 μm.

4. The negative-electrode plate according to claim 1, wherein the polymer film layer is a porous structure; and/or the alkali metal is at least one of lithium, potassium, and sodium.

5. A secondary battery, comprising a positive-electrode plate, a negative-electrode plate, a separator disposed between the positive-electrode plate and the negative-electrode plate, and an electrolyte solution, wherein the negative-electrode plate comprises an alkali metal layer and a polymer film layer provided on at least one surface of the alkali metal layer, the polymer film layer comprises a first surface and a second surface that are back away from each other in the thickness direction of the polymer film layer, the first surface being an outer surface of the polymer film layer facing away from the alkali metal layer, and the second surface being an inner surface of the polymer film layer facing towards the alkali metal layer, resistivity of the first surface is denoted as R1, resistivity of the second surface is denoted as R2, and the polymer film layer satisfies that resistivity increases continuously from R2 to R1, R1 is $10^2$ Ω·cm-$10^9$ Ω·cm, R2 is 1 Ω·cm-$10^4$ Ω·cm.

6. The secondary battery according to claim 5, wherein the battery is an alkali metal battery, and preferably a lithium metal secondary battery, a potassium metal secondary battery, or a sodium metal secondary battery.

7. A battery module, comprising the secondary battery according to claim 5.

8. A battery pack, comprising the battery module according to claim 7.

9. An electric apparatus, comprising at least one or more of the secondary battery according to claim 5, the battery module according to claim 7, or the battery pack according to claim 8.

10. The negative-electrode plate according to claim 1, wherein R1 is $10^3$ Ω·cm-$10^6$ Ω·cm, R2 is 1 Ω·cm-$10^4$ Ω·cm.

11. The negative-electrode plate according to claim 1, wherein R1 is $10^5$ Ω·cm-$10^6$ Ω·cm, R2 is 5 Ω·cm-1000 Ω·cm.

12. The negative-electrode plate according to claim 1, wherein the polymer film layer has a porosity of not less than 50%.

13. The negative-electrode plate according to claim 1, wherein the polymer film layer has an oxygen content gradient continuously decreasing from the outer surface to the inner surface.

* * * * *